July 29, 1924.

J. W. DROLL 1,503,351

MATTRESS ROLL FORMING MECHANISM

Filed July 18, 1922   10 Sheets-Sheet 8

Fig. 8.

Inventor
Joseph W. Droll
By Austin L. Slee
Atty.

July 29, 1924.

J. W. DROLL

MATTRESS ROLL FORMING MECHANISM

Filed July 18, 1922  10 Sheets-Sheet 9

1,503,351

Patented July 29, 1924.

1,503,351

UNITED STATES PATENT OFFICE.

JOSEPH W. DROLL, OF CHICAGO, ILLINOIS, ASSIGNOR TO DROLL PATENTS CORPORATION OF DELAWARE, A CORPORATION OF DELAWARE.

MATTRESS-ROLL-FORMING MECHANISM.

Application filed July 18, 1922. Serial No. 575,813.

*To all whom it may concern:*

Be it known that I, JOSEPH W. DROLL, a citizen of the United States, residing in the city of Chicago, county of Cook, and State of Illinois, have invented a new and useful Improvement in a Mattress-Roll-Forming Mechanism, of which the following is a specification.

My invention relates to improvements in mattress stitching machines and particularly to improved mechanism for packing stuffing into the corners of a mattress to form a roll therealong.

The primary object of my invention is to provide an improved roll forming mechanism for mattress stitching machines.

Another object is to provide an improved mechanism in which a pair of packing needles are adapted for longitudinal movement along guides arranged to be pivoted to cause the needles to be pivotally moved after entering the edge of a mattress or the like and to be withdrawn from said mattress while in the pivoted position to prevent disturbance of the stuffing packed within the corner of the mattress to form the roll.

A further object is to provide an improved construction adapted to give increased strength and smoothness of operation.

Another object is to provide improved means for holding the edge of a mattress in position to be engaged by the packing needles to insure a uniform roll.

A still further object is to provide improved means for gathering slack in the ticking and forming said slack into a tuck to give a neater appearance to the roll.

I accomplish these and other objects by means of the device disclosed in the drawings forming a part of the present specification wherein like characters of reference are used to designate similar parts throughout said specification and drawings, and in which:

Referring to the drawings it will be seen that my improved machine consists of a supporting frame 1 carried by suitable castors 2 mounted thereon and engaging a channel track 3 secured upon the sides of a work supporting table 4, said frame 1 being guided by upper guide rollers 6 engaging the channel track 3 and lower guide rollers 7 and 8 engaging opposite sides of a channel guide 9 upon the lower portion of the table supporting legs 11.

A frame 12 is adjustably secured upon suitable guides formed upon the frame 1 to permit vertical adjustment thereto in a manner fully described in a copending application Serial #575,814, filed July 18, 1922. A head 13 is mounted upon the upper portion of the frame 12, said head extending over the edge of the work supporting table 4 and being pivotally connected as at 15 upon the frame 12 to permit adjustment of the inclination of the head 13 relative to said table.

A cam 14 is rotatably mounted within the head 13 upon a shaft 16, said cam being provided with gear teeth 17 upon the periphery thereof. The cam 14 is rotated by a pinion 18 operatively connected to an electric motor 19 in a manner fully described in the copending application above referred to.

The machine is arranged to be moved intermittently along the edge of the mattress supporting table 4 by means of a gear 21 mounted upon the frame 1 to engage a rack 22 secured upon the edge of the table. The gear 21 is intermittently actuated by the cam 14 which is connected thereto by suitable connecting means including a shaft 23 driven by a segment gear 24 pivotally mounted within the head upon a shaft 26. The segment gear 24 is actuated by a link 27 connected to an arm 28 mounted for pivotal movement upon a pivot 29, said arm 28 being actuated by a crank 31 carried upon a shaft 30 and connected to the cam 14 by means of an arm 32 carrying a roller 33 engaging a groove 34 formed in the side of the cam. The intermittent movement mechanism above briefly described has been made the subject of a separate application in which the several connections and their operation are fully described, and as this mechanism forms no part of the present invention no further description need herein be given.

A roll shaped element 36 is mounted upon the under side of the head 13 adjacent the edge of the table 4 to receive the edge of a mattress M supported thereon. Pivotally mounted upon pins 37 upon opposite sides of the shaping element 36 are provided a pair of guides 38 each arranged to engage a packing needle 39 slidably mounted thereon.

The packing needles 39 are arranged to be moved longitudinally along the guides 38 by means of links 41 connected between the needles and a pair of arms 42 secured upon shafts 43 pivotally mounted with the head 13. Gear segments 44 concentric with the shafts 43 are formed upon the adjacent ends of the arms 42, said segments being arranged in meshing relation whereby a movement of one arm in either direction imparts a similar movement to the other. A lever 46 is secured at one end upon one of the arms 42, the other end of said lever 46 being provided with a roller 47 adapted to engage the groove 34 of the cam 14 whereby an oscillating movement is imparted to the arms when the cam is rotated, said movement of the arms causing the needles 39 to be reciprocated within the guides 38.

The guides 38 are moved about their pivots 37 by means of links 48 connected between said guides and a slide member 49 mounted within a guide 51 and reciprocated therein by a link 52 connected to an extension 53 formed upon the crank actuating arm 32 which is oscillated by the cam groove 34.

Figure 1:
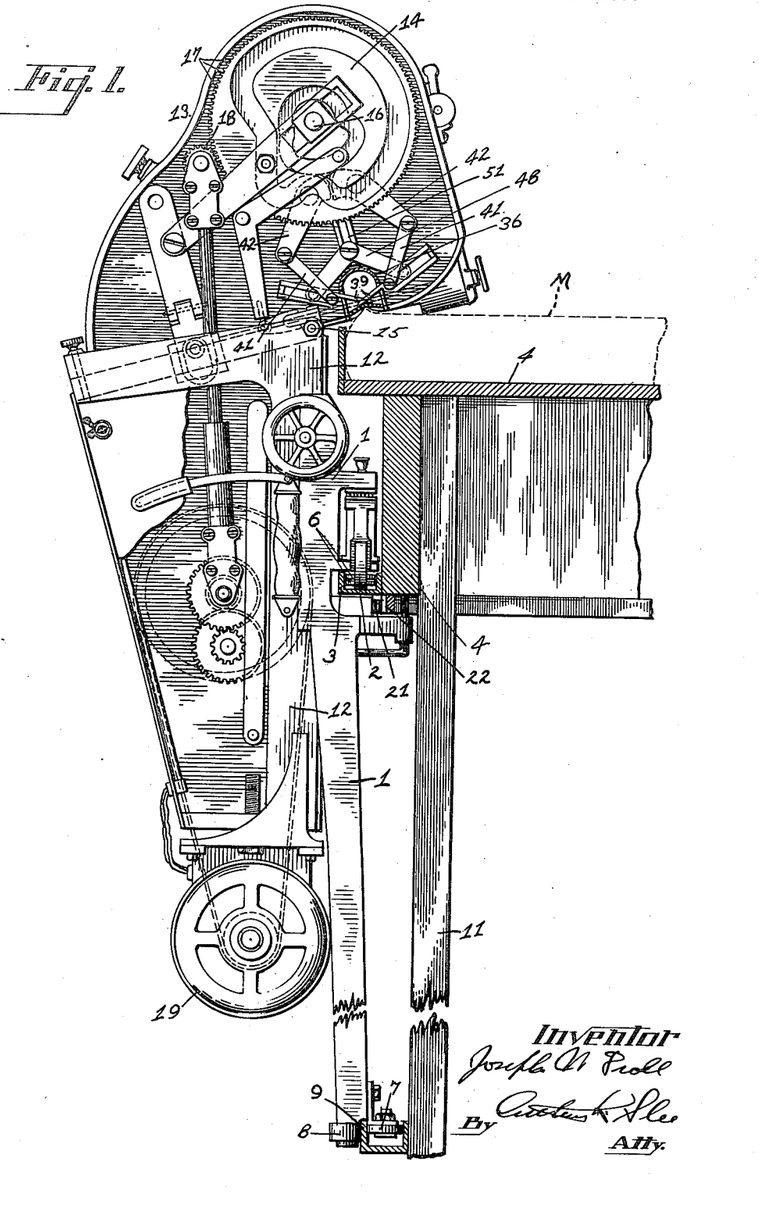
Fig. 1 is a broken side elevation of my improved mattress roll forming machine as mounted upon a work supporting table.
Figure 2:
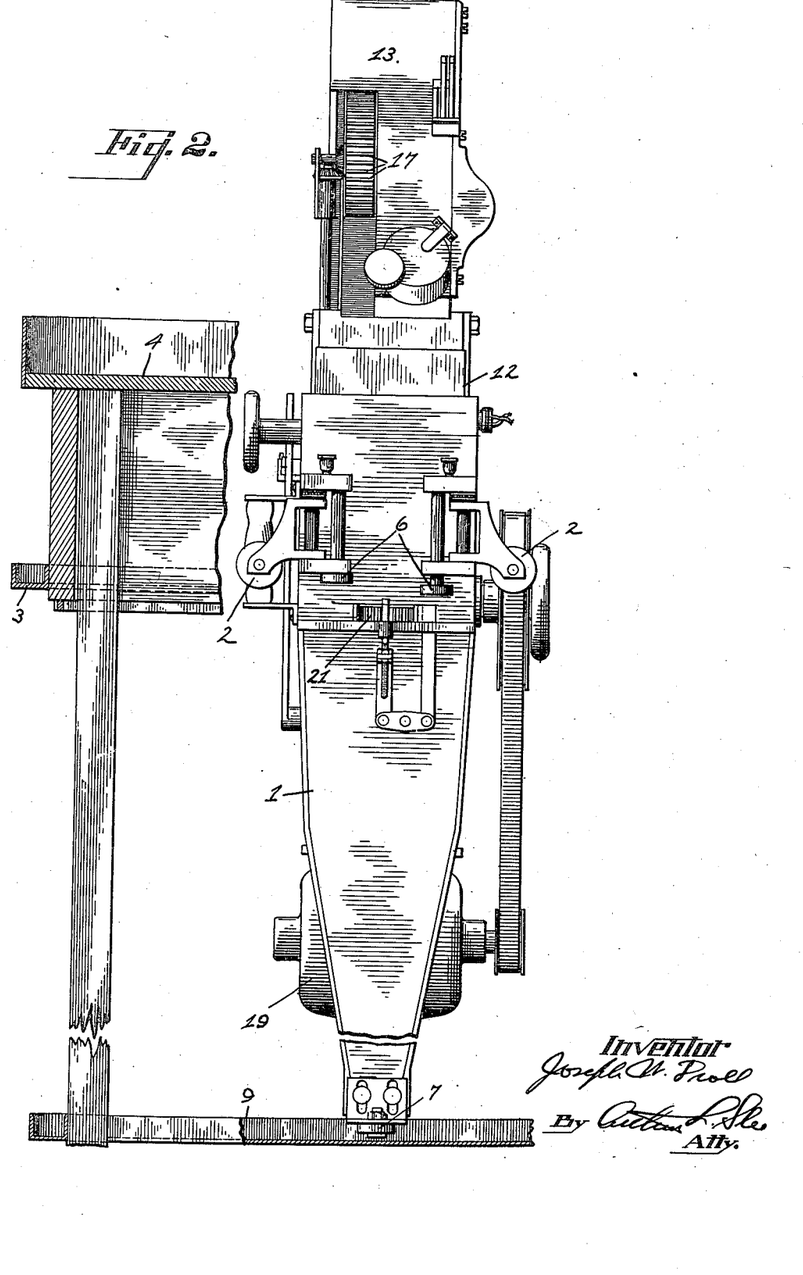
Fig. 2 is a front elevation of the machine as shown in Fig. 1.
Figure 3:
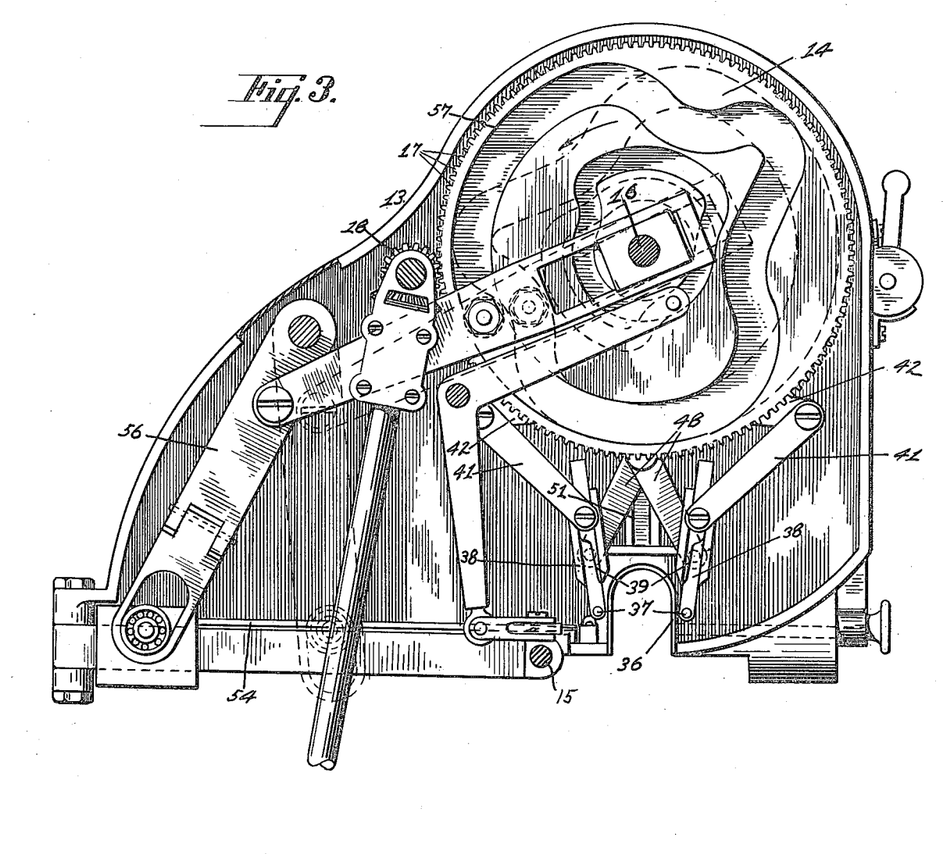
Fig. 3 is an enlarged side elevation of the head of the machine with the outer cover removed, the roll forming mechanism being shown in the normal starting position.
Figure 4:
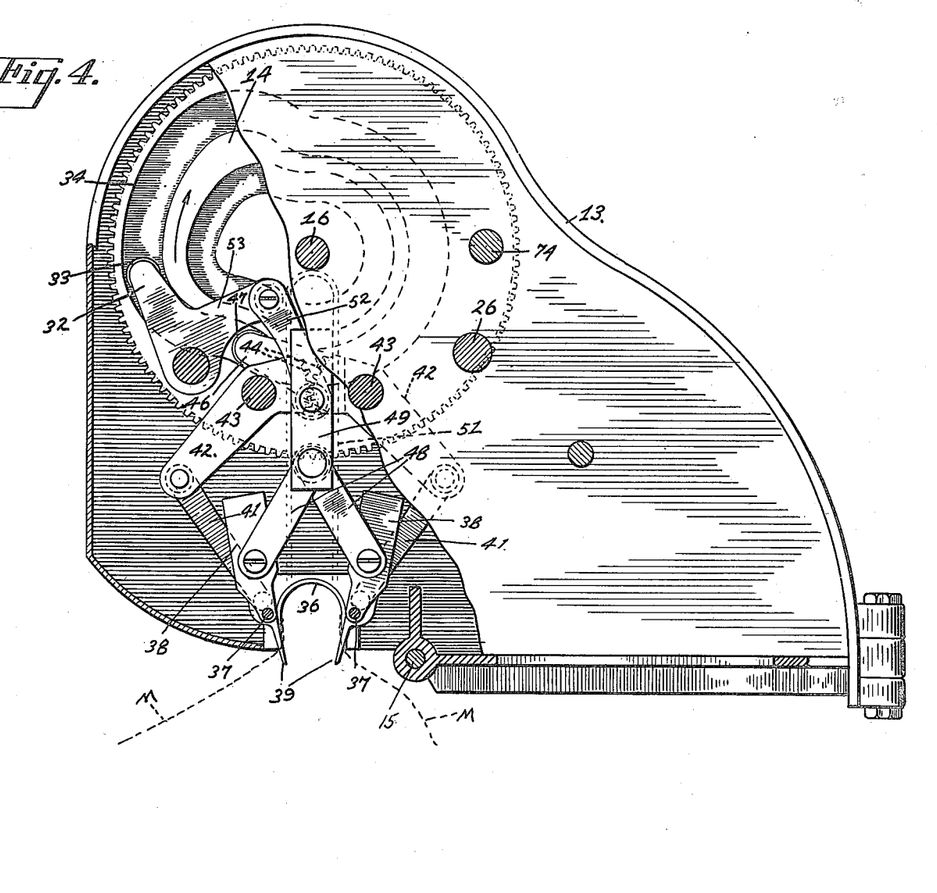
Fig. 4 is a view of the other side of the head with parts broken away and shown in section, the packing needles being shown in the advanced position to enter the mattress.
Figure 5:
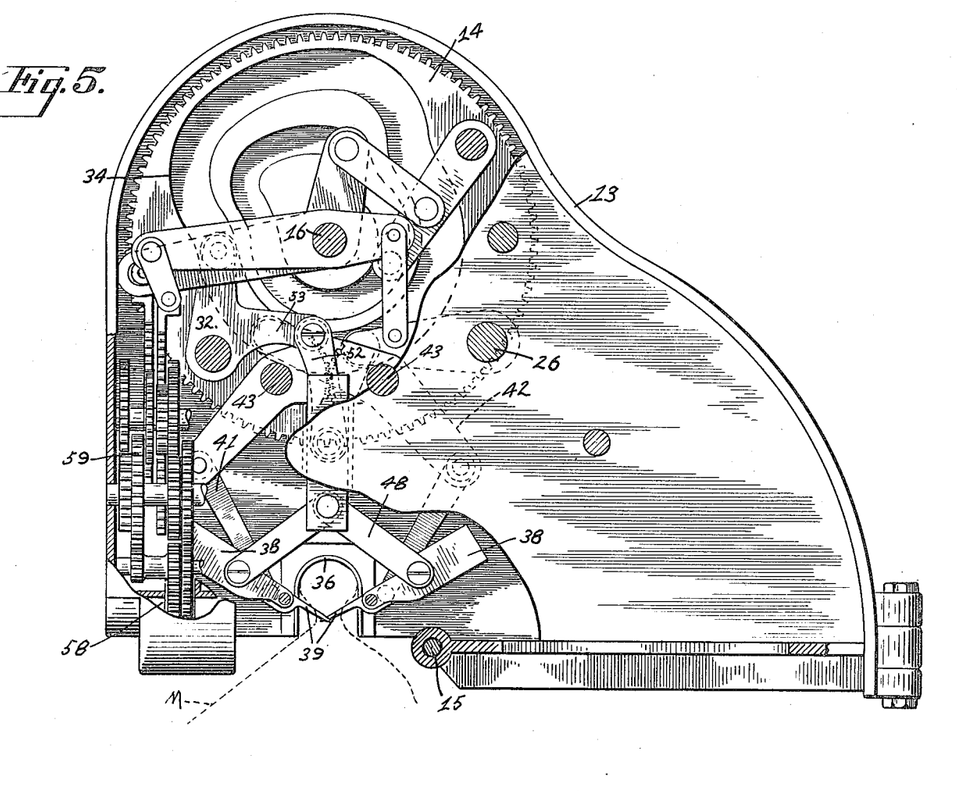
Fig. 5 is a view showing the needles pivoted to move stuffing into the corner of the mattress, and also showing the relation between said packing needles and other portions of the machine.

In the normal starting position the needles 39 are receded along the guides 38 and the guides 38 moved about their pivots 37 to the position shown in Fig. 3 of the drawings. From this position a rotation of the cam 14 in the direction indicated by the arrow causes a drop in the cam groove 34 to engage the roller 47 and cause the lever 46 and the arms 42 to be moved to the position indicated in Fig. 4 of the drawings thereby moving the needles 39 longitudinally along the guides, said needles entering the mattress M. As the cam is further rotated the above mentioned drop in the groove 34 causes the arm 32 to be turned about its pivot, the extension 53 and the link 52 causing the slide member 49 to be moved downwardly along the guide 51, said downward movement causing the links 48 to turn the guides 38 about their pivots. The pivotal movement of the guides 38 after the needles 39 enter the mattress causes said needles to be moved upwardly toward the corner of the mattress, thereby forcing a portion of the stuffing within the mattress into said corner to form a firm roll shaped by the element 36. The needles are maintained in the pivoted position to hold the stuffing within the roll so formed while a sewing needle 54 is advanced by an arm 56 to form a stitch through said roll to permanently secure the same.

The sewing needle 54 is actuated by virtue of a cam groove 57 upon the outer side of the cam 14 and cooperates with a shuttle 58 and shuttle actuating means designated in general by the numeral 59. The mechanism for operating the needle 54 and shuttle 58 is fully described in a copending application Serial #575,812, filed July 18, 1922 and as said mechanism forms no part of the present invention a further description of the same is here unnecessary.

After the formation of the stitch through the roll, a rise in the cam groove 34 causes the arms 42 to be moved pivotally back to the starting position and the needles 39 moved longitudinally along the guides 38 to disengage the mattress. The guides are maintained in the pivoted position by the links 48 until after the needles are entirely removed from the mattress, said needles being thus withdrawn without disturbing the stuffing packed into the corner to form the roll.

Figure 6:
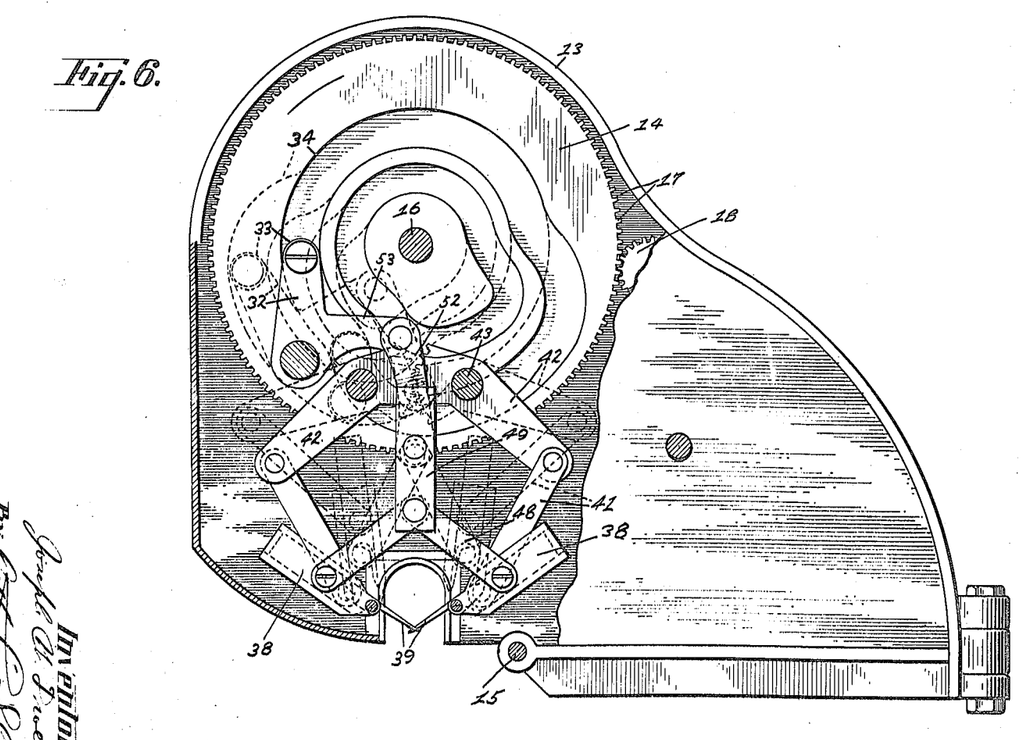
Fig. 6 is a view similar to Fig. 4 disclosing the manner in which the needles are moved from the roll forming position shown in full lines to the normal starting position as disclosed in dotted lines.

Immediately after the needles 39 have been moved to disengage the mattress as above described, the rise in the cam 34 engages the roller 33 thus moving the arm 32 back to its normal position and causing the extension 53 to move the slide member 49 upwardly along its guide, thereby causing the links 48 to move the guides 38 pivotally back to the normal starting position as shown in dotted lines in Fig. 6 of the drawings.

A pair of rollers 61 carried by shafts 62 are pivotally and rotatably mounted adjacent the packing needles 39 to engage the formed roll and hold the same closely against the shaping element 36 when the machine is moved forward along the table 4. The shafts 62 are rotatably mounted within members 63 secured upon transverse shafts 64. The upper end of each shaft 62 is provided with a bevel gear 66 meshing with a bevel gear 67 secured upon a spur gear 68 rotatably mounted upon the corresponding shaft 64. The gear 68 upon one shaft 64 is arranged to mesh with the gear 68 of the other shaft whereby a rotation of either gear in either direction will cause the other gear to rotate in the opposite direction and the rollers 61 actuated by said gears to be thereby similarly rotated in opposite directions.

Figure 7:
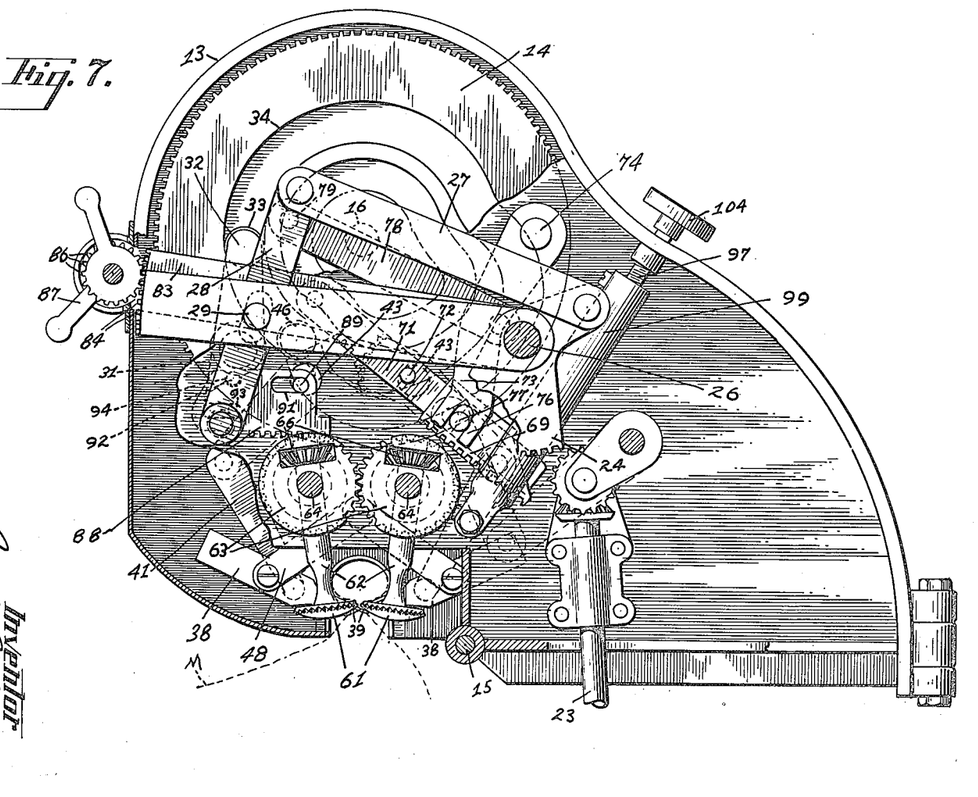
Fig. 7 is a view of the head showing the feed roller and actuating mechanism therefor, as positioned during the period while the machine is stationary.

During the periods when the machine is being advanced along the edge of the mattress the rollers 61 are rotated in a direction opposing the direction of movement of the machine and at a peripheral speed equal to the rate of movement of the machine by means of a rack 69 slidably mounted upon a guide 71 pivotally mounted within the head 13 of the machine. The guide 71 is provided with an aperture engaging an extension 72 eccentrically disposed upon the adjacent end of one of the shafts 43 carrying the needle actuating arms 42. The extension 72 is so disposed as to lift and maintain the guide 71 in the position shown in Fig. 7 of the drawings while the machine is stationary and the packing needles 39 moved to engage the mattress. As the shaft 43 and arm 42 is oscillated to withdraw the needle connected thereto from the mattress the guide is lowered to bring the rack 69 into meshing relation with the adjacent gear 68.

The rack 69 is reciprocated along the guide 71 by an arm 73 pivotally mounted upon a shaft 74 and having a forked end 76 engaging an extension 77 secured upon the side of the rack. The arm 73 is oscillated by means of a link 78 connected between said arm and one end of a lever 79 the other end of which is connected to the crank 31, said crank being oscillated by the arm 32 and roller 33 engaging the cam groove 34 as above described. The lever 79 is provided with a longitudinally disposed slot 81 at the approximate center thereof, said slot being arranged to engage a pin 82 carried by a member 83 pivotally connected at one end thereof upon the shaft 26 and provided at the other end thereof with gear teeth 84 meshing with teeth 86 formed upon an adjusting member 87. Oscillation of the crank 31 causes the lever 79 to be turned about the pivot 82, the amount of movement of the end of the lever being adjusted by raising or lowering the pivot 82 to vary the relative lengths of the upper and lower portions of the lever by partially rotating the adjusting member 86 to lift or lower the end of the member 83 the required amount.

At the end of the forward movement of the machine the arms 42 are again moved to force the needles 39 into the mattress said movement causing the shaft 43 and its extension 77 to lift the guide 71 and move the rack 69 out of engagement with its gear 68. At the same time, a rack 88 is moved into engagement with the other gear 68, said rack 88 being pivotally moved by an extension 89 eccentrically secured upon the end of the other shaft 43 and arranged to engage a slot 91 formed in the rack 88. The extension 89 is so positioned as to lift and hold the rack 88 out of engagement with its gear 68 during the forward movement of the machine while the needles 39 are withdrawn from the mattress and to lower said rack into operative position as said needles are again inserted into the mattress. The rack 88 is slidably and pivotally mounted upon a pin 93 and is reciprocated by means of a pin 92 secured upon the crank 31, said pin 92 being arranged to engage a recess 94 formed upon the upper edge of the rack. The movement of the crank actuating arm 32 to pivotally move the packing needle guides as above explained thus causes the rack to be moved a short distance immediately after the needles enter the mattress, the direction of said movement being such as to rotate the gears 68 and the rollers 61 in a direction opposite to that occurring during the forward movement of the machine.

Figure 8:
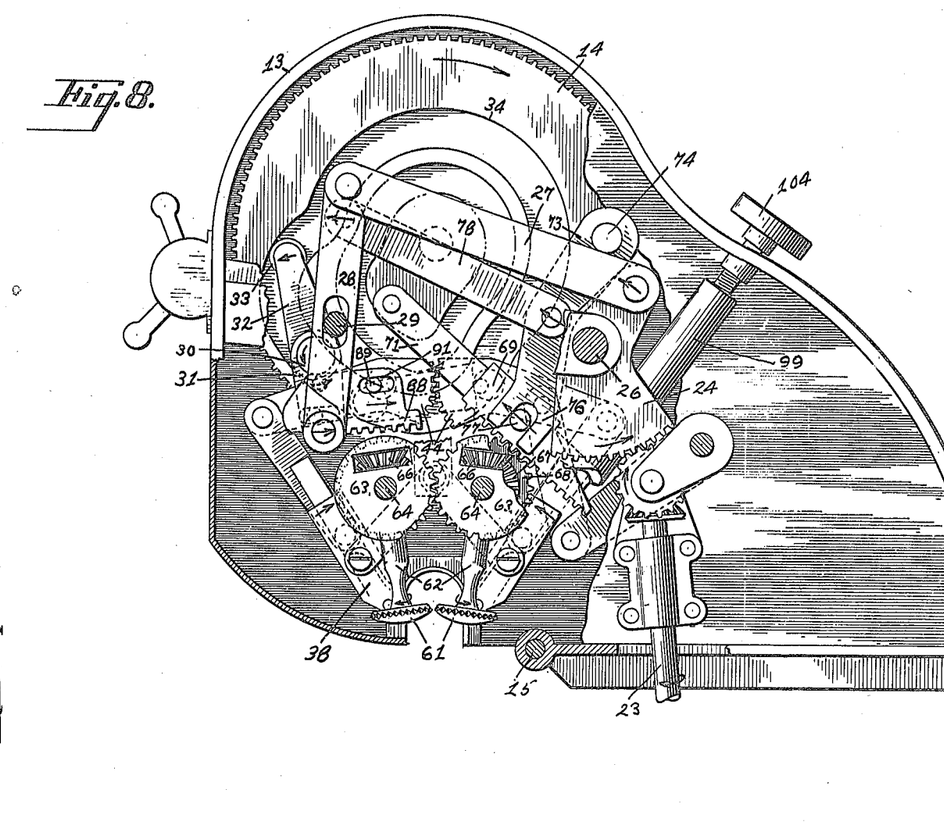
Fig. 8 is a similar view disclosing the manner in which the rollers are rotated simultaneously with the forward movement of the machine.

In Fig. 8 of the drawings I have shown the manner in which the rollers 61 are actuated during the forward movement of the machine, the figure showing the several members in the position existing when said forward movement is approximately half completed. It will be noted that the packing needles are withdrawn from the mattress and that the guides 38 are being moved pivotally back to the starting position. The segment gear 24 is in operative engagement with its driven connections and is being moved to advance the machine along the table 4, by virtue of its connection to the crank 31. The rack 69 is being moved upwardly along its guide 71 to rotate the rollers 61 and the rack 88 is being returned idle to its starting position. The direction of the several movements are indicated by arrows in the drawings.

Figures 9, 14:
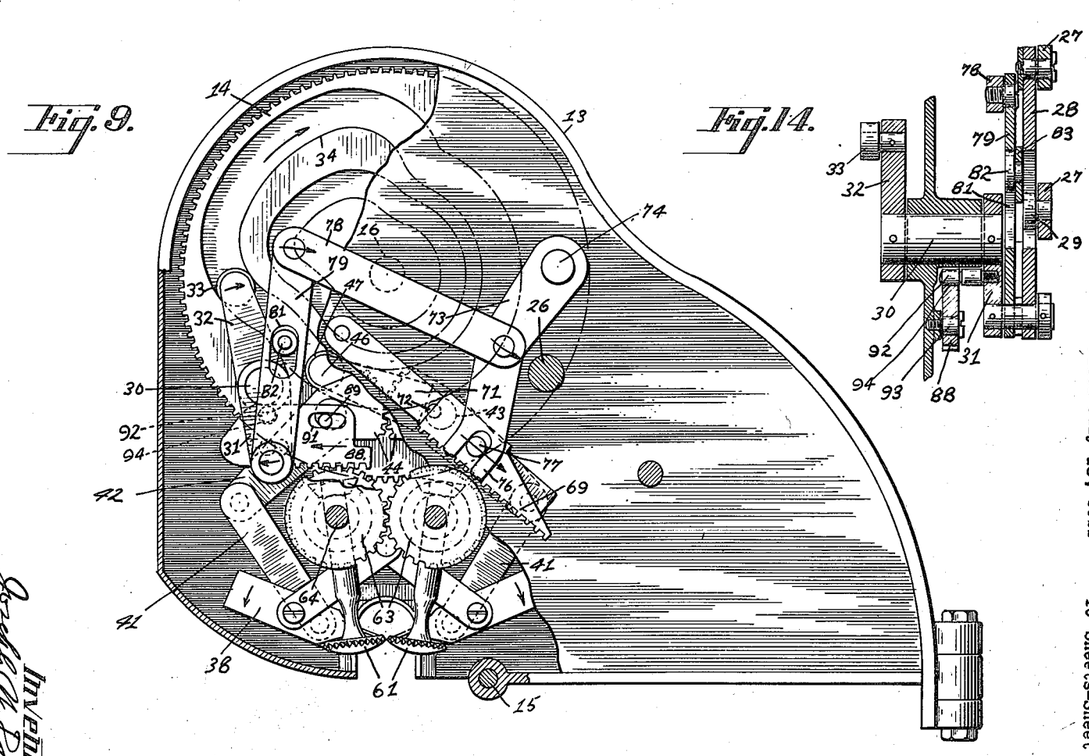
Fig. 9 is a similar view disclosing the manner in which the rollers are rotated in the opposite direction after the forward movement of the machine has been completed.
Fig. 14 is a vertical transverse sectional detail of the rack actuating connections.
Figures 10, 11:
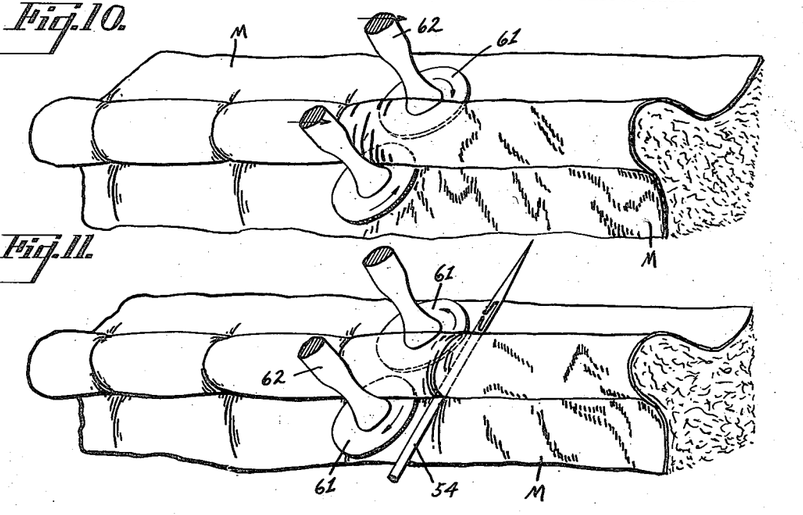
Fig. 10 is a broken perspective view showing the manner in which the feed rollers engage the mattress during the forward movement of the machine.
Fig. 11 is a similar view showing the manner in which the slack ticking is gathered by a reverse rotation of the feed rollers.

In Fig. 9 I have shown the condition existing after the forward movement of the machine is completed, the rack 69 being returned idle to its normal starting position, and the rack 88 is being moved to rotate the rollers 61 in the reverse direction while the needles are being pivotally moved by the guides 38 to the roll packing position.

The rollers 61 are preferably provided with serrated edges adapted to give firm engagement with the mattress. The rotation of the rollers 61 during the forward movement of the machine, as above mentioned, serves to hold the mattress firmly in engagement with the shaping element 36. The tension in the thread with which the roll is permanently sewed, together with the friction between the shaper element 36 and the mattress creates a tendency for the mattress to be advanced slightly with each forward movement of the machine. By rotating the rollers 61 in a direction opposing the movement of the machine, as above described, this tendency is completely overcome as the rotation of the rollers at a peripheral speed equal to the rate of movement of the machine tends to move the mattress rearwardly at the same rate as the machine is moving forward, thereby preventing movement of said mattress upon the table.

The rotation of the rollers 61 causes a slight amount of slack ticking to be moved between the rollers and the preceding stitch. After the machine becomes stationary the rollers are caused to rotate a slight amount in the reverse direction in order to gather this slack ticking and move the same forward. The frictional resistance between the stuffing within the mattress and the ticking causes the slack ticking so gathered to form a fold or tuck immediately in advance of the rollers. The subsequent operation of the packing and sewing mechanism causes the tuck so formed to be firmly stitched down, thus giving a smooth and uniform appearance to the roll.

The rollers are normally held in engagement with the roll by means of a spring 96 mounted upon a threaded rod 97 the upper end of which extends outwardly through the head 13. The lower end of the rod 97 slidably engages a bushing 98 secured within the tubular member 99 the lower end of which is pivotally connected upon one of the members 63. The upper portion of the tubular member 99 is slotted as at 102 to engage a set screw 101 set into a collar 103 threaded upon the rod 97. The spring is compressed between the collar 103 and the bushing 98 thereby tending to force the tubular member downwardly and thus turning the member 63 and the shaft 62 about the shaft 64 the roller 61 being thus forced against the side of the mattress roll. The members 63 are caused to move simultaneously in opposite directions by means of gear teeth 65 formed upon the proximate portions of their peripheries thus causing equal pressures to be applied upon opposite sides of the mattress roll. The pressure applied by the spring is adjusted by advancing or receding the collar 103 along the rod 97, a knob 104 being secured upon the outwardly extending end of said rod by which the same may be rotated to move the collar 103 therealong.

Figures 12, 13:
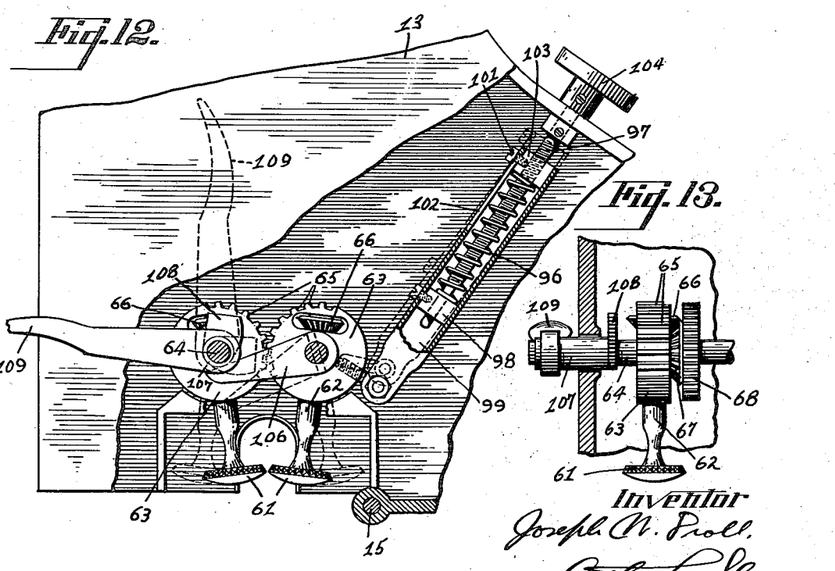
Fig. 12 is a broken side elevation of a portion of the head of the machine showing the manner in which the feed rollers are mounted for pivotal movement to permit said roller to be moved out of engagement with the mattress.
Fig. 13 is a broken vertical section disclosing the manner in which the feed rollers are mounted.

The rollers 61 are arranged to be manually separated by means of a lever 106 secured upon one of the shafts 64. A sleeve 107 is rotatably mounted upon the other shaft 64, said sleeve carrying at its inner end a cam portion 108 arranged to engage the lever 106. An operating lever 109 is secured upon the outer end of the sleeve. By raising the lever 109 to the position shown in dotted lines in Fig. 12 of the drawings the cam portion 108 causes the lever 106 to be depressed and the members 63 rotated to move the rollers 61 out of engagement with the mattress. A further movement of the lever 109 causes a flat portion of the cam to engage the lever 107 whereby the rollers 61 may be retained in the disengaging position while arranging a mattress in position to be stitched or for other purposes as desired.

While I have illustrated and described the construction which I have found to afford greatest strength and smoothness of operation I do not wish to restrict myself to the construction as shown, but reserve all such modifications in form and arrangement as shall fall within the scope of the appended claims.

Having thus described my invention what I claim as new and desire to secure by Letters Patent is:

1. In a mattress stitching machine, a roll forming mechanism comprising a pair of pivotally mounted packing needle guides; a pair of packing needles slidably mounted upon said guides; means for moving said needles longitudinally along said guides to enter a mattress adjacent a corner thereof; and means for pivotally moving the guides and the needles carried thereby to pack stuffing into said corner to form a roll therealong.

2. In a mattress stitching machine, a roll forming mechanism comprising a pair of pivotally mounted packing needle guides; a pair of packing needles slidably mounted upon said guides; means for moving said needles longitudinally along said guides to enter a mattress adjacent a corner thereof; means for pivotally moving said guides and the needles carried thereby to pack stuffing from the mattress into said corner to form a roll therealong; and means for receding the needles longitudinally along the guides in their pivoted position to disengage the mattress after the formation of the roll to prevent disturbance of the stuffing within the roll 3. In a mattress stitching machine, a roll forming mechanism comprising a pair of pivotally mounted packing needle guides; a pair of packing needles slidably mounted upon said guides; means for reciprocating said needles longitudinally along said guides to enter a mattress adjacent a corner thereof; means for pivotally moving said guides and the needles carried thereby after said needles enter the mattress to pack stuffing from the mattress into said corner to form a roll therealong, and for returning the needles to their starting position after said needles have been withdrawn longitudinally along the guides to disengage the mattress after the forming of the roll.

4. In a mattress stitching machine, a roll forming mechanism comprising a pair of pivotally mounted packing needle guides; a pair of packing needles slidably mounted upon said guides; means for reciprocating said needles longitudinally along said guides to enter a mattress adjacent a corner thereof; means for pivotally moving said guides and the needles carried thereby after said needles enter the mattress to pack stuffing from the mattress into said corner to form a roll therealong, and for returning the needles to their starting position after said needles have been withdrawn longitudinally along the guides to disengage the mattress after the forming of the roll; and means for sewing the roll so formed.

5. In a mattress stitching machine adapted to be moved intermittently along the edge of a mattress, a cam; a pair of pivotally mounted packing needle guides; a pair of packing needles slidably mounted upon the guides; links connected between the cam and the packing needles for reciprocating said needles longitudinally along the guides to enter the mattress adjacent a corner thereof; links connected between the guides and the cam for pivotally moving said guides and the needles carried thereby to pack stuffing into the corner after said needles enter the mattress to form a roll, and to return said guides and needles to a starting position after the needles have been moved longitudinally along the guides by the first mentioned links to disengage the mattress after forming the roll.

6. In a mattress stitching machine adapted to be moved intermittently along the edge of a mattress, a cam; a pair of pivotally mounted packing needle guides; a pair of packing needles slidably mounted upon the guides; a pair of needle actuating arms pivotally mounted upon the machine adjacent the cam, said arms having intermeshing teeth upon their adjacent ends; means connecting one of said arms to the cam for imparting movement to both arms when the cam is rotated; links connected between said arms and the packing needles for imparting a reciprocating movement thereto longitudinally along the guides to cause said needles to enter the mattress adjacent a corner thereof when the arms are moved in one direction by the cam; and means connected between the cam and the guides for pivotally moving said guides and the needles carried thereby after said needles enter the mattress to pack stuffing into the corner to form a roll, and to return said guides and needles to a starting position after the needles have been moved longitudinally along the guides to disengage the mattress after forming the roll.

7. In a mattress stitching machine adapted to be moved intermittently along the edge of a mattress, a pair of slidably and pivotally mounted packing needles arranged to enter the mattress adjacent a corner thereof to pack stuffing into said corner to form a roll; a pair of rollers mounted adjacent the packing needles to engage the corner of the mattress, said rollers being actuated in timed relation with the forward movement of the machine to maintain said corner in position to be engaged by the packing needles after each forward movement of the machine.

8. In a mattress stitching machine adapted to be moved intermittently along the edge of a mattress, a pair of slidably and pivotally mounted packing needles arranged to enter the mattress adjacent a corner thereof to pack stuffing into said corner to form a roll; a pair of rollers mounted adjacent the packing needles to engage the corner of the mattress, said rollers being rotated in timed relation with the forward movement of the machine to maintain said corner in a position to be engaged by the packing needles after each forward movement of the machine; and means for rotating the rollers in the opposite direction after each forward movement to gather slack ticking to form a tuck.

9. In a mattress stitching machine adapted to be moved intermittently along the edge of a mattress, a pair of slidably and pivotally mounted needles arranged to be moved into a mattres adjacent a corner thereof to pack stuffing into said corner to form a roll; a pair of pivotally and rotatably mounted rollers mounted adjacent the packing needles; means for rotating the rollers during forward movement of the machine to maintain the mattress in position to be engaged by the packing needles after each forward movement; means for rotating said rollers in the opposite direction after each forward movement to gather slack ticking and form the same into a tuck; and means for moving said rollers about their pivot mountings to normally maintain the same in engagement with the roll of the mattress.

10. In a mattress stitching machine adapted to be moved intermittently along the edge of a mattress, a pair of slidably and pivotally mounted packing needles arranged to be moved into the mattress adjacent a corner thereof to pack stuffing into said corner to form a roll; a pair of rollers mounted adjacent the packing needles to engage the roll; a gear operatively connected to each roller, the gear of one roller meshing with the corresponding gear of the other roller; a rack pivotally and slidably mounted adjacent one of said gears, said rack being normally held out of engagement with the gear while the machine is stationary and arranged to be moved into meshing relation with said gear when the machine is in motion; and means for reciprocating said rack to rotate the rollers during the forward movement of the machine to maintain the mattress in position to be engaged by the packing needles after said forward movement.

11. In a mattress stitching machine adapted to be moved intermittently along the edge of a mattress, a pair of slidably and pivotally mounted packing needles arranged to be moved into the mattress adjacent a corner thereof to pack stuffing into said corner to form a roll; a pair of rollers mounted adjacent the packing needles to engage the roll; a gear operatively connected to each roller, the gear of one roller meshing with the corresponding gear of the other roller; a rack pivotally and slidably mounted adjacent one of said gears, said rack being normally held out of engagement with the gear while the machine is stationary and arranged to be moved into meshing relation with said gear when the machine is in motion; means for reciprocating said rack to rotate the rollers during the forward movement of the machine to maintain the mattress in position to be engaged by the packing needles after said forward movement; and a rack mounted adjacent the other gear, said rack being arranged to normally disengage said gear while the machine is in motion, and to mesh with said gear while the machine is stationary; and means for moving the rack to rotate the rollers in the opposite direction after each forward movement of the machine to gather slack ticking between the needles and the previous stitch to form a tuck.

12. In a mattress stitching machine adapted to be moved intermittently along the edge of a mattress, a pair of pivotally and rotatably mounted rollers; a gear connected with each roller for rotating the same; a rack pivotally and slidably mounted adjacent the rollers and adapted to rotate the same in one direction by virtue of said gears when the machine is moved along the edge of the mattress; a second rack pivotally and slidably mounted adjacent the rollers to engage the gears connected thereto and to rotate the same in an opposite direction after each movement of the machine relative to the mattress as and for the purpose described.

13. In a mattress stitching machine adapted to be moved intermittently along the edge of a mattress, a pair of pivotally and rotatably mounted rollers arranged to engage the edge of the mattress; a gear operatively connected to each roller for rotating the same; a rack pivotally and slidably mounted adjacent said gears; means for reciprocating said rack; means for moving said rack pivotally into operative engagement with said gears when the machine is in motion for rotating the rollers in one direction during the forward movement of the machine; a second rack pivotally mounted adjacent said gears; means for reciprocating said second gear; means for moving said second gear pivotally into operative engagement with the gears for rotating the rollers in the opposite direction after said forward movement; and means for normally maintaining said rollers in engagement with the edge of the mattress as and for the purposes described.

14. In a mattress stitching machine adapted to be moved intermittently along the edge of a mattress, a pair of pivotally and rotatably mounted rollers arranged to engage the edge of the mattress; a gear operatively connected to each roller for rotating the same; a rack pivotally and slidably mounted adjacent said gears; means for reciprocating said rack; means for moving said rack pivotally into operative engagement with said gears when the machine is in motion for rotating the rollers in one direction during the forward movement of the machine; a second rack pivotally mounted adjacent said gears; means for reciprocating said second rack; means for moving said second rack pivotally into operative engagement with the gears for rotating the rollers in the opposite direction after said forward movement; means for normally maintaining said rollers in engagement with the edge of the mattress; and means for moving said rollers pivotally out of engagement with the mattress.

15. In a mattress stitching machine, a pair of rollers adapted to engage the edge of a mattress, and means for rotating the rollers alternately in opposite directions with respect to the mattress, said rollers being rotated simultaneously in opposite directions with respect to each other.

16. In a mattress stitching machine, a pair of rollers adapted to engage the edge of a mattress; means for rotating the rollers alternately in opposite directions with respect to the mattress, said rollers being rotated simultaneously in opposite directions with respect to each other; and means for adjusting the amount of rotation of said rollers.

17. In a mattress stitching machine, a pair of rollers adapted to engage the edge of a mattress; means for rotating the rollers alternately in opposite directions with respect to the mattress, said rollers being rotated simultaneously in opposite directions with respect to each other; and means for normally holding said rollers in engagement with said edge.

18. In a mattress stitching machine, a pair of rollers adapted to engage the edge of a mattress; means for rotating the rollers alternately in opposite directions with respect to the mattress, said rollers being rotated simultaneously in opposite directions with respect to each other; means for normally holding said rollers in engagement with said edge; and means for manually moving said rollers to disengage the edge of the mattress.

In witness whereof I hereunto set my signature.

JOSEPH W. DROLL.